Figure 1:
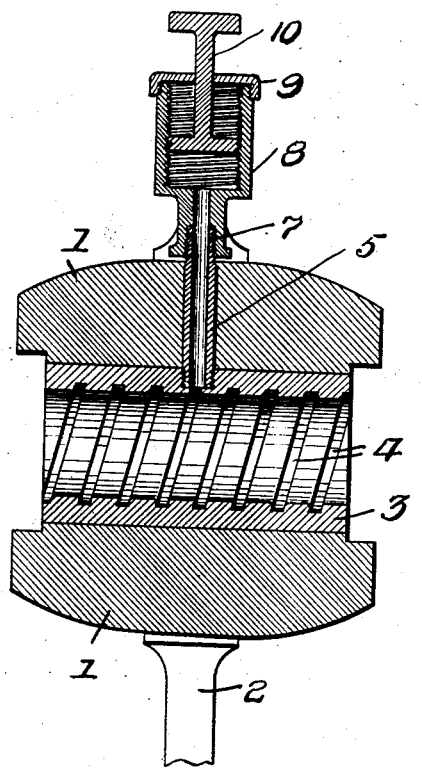

No. 895,885. PATENTED AUG. 11, 1908.
J. L. NEHRIG.
LUBRICATOR.
APPLICATION FILED JUNE 6, 1906.

Witnesses
Eugene A. Prokop.

Inventor,
J. L. Nehrig,
By
ATTORNEYS

UNITED STATES PATENT OFFICE.

JOSEPH L. NEHRIG, OF ARDARA STATION, PENNSYLVANIA.

LUBRICATOR.

No. 895,885.         Specification of Letters Patent.         Patented Aug. 11, 1908.

Application filed June 6, 1906. Serial No. 320,422.

*To all whom it may concern:*

Be it known that I, JOSEPH L. NEHRIG, citizen of the United States of America, residing at Ardara Station, in the county of Westmoreland and State of Pennsylvania, have invented certain new and useful Improvements in Lubricators, of which the following is a specification, reference being had therein to the accompanying drawing.

This invention relates to certain new and useful improvements in vehicle lubricators, and the invention has for its primary object the provision of novel means for equally distributing a lubricant over the surface of a spindle or axle stub.

Another object of this invention is the provision of novel means for retaining a quantity of lubricating oil in close proximity to the hub of a wheel, whereby the spindle or axle upon which the wheel is journaled may be lubricated at all times.

A further object of this invention is to provide a lubricator for vehicle wheels which will be extremely simple in construction, strong and durable, comparatively inexpensive to manufacture, and highly efficient for the purposes for which it is used.

With the above and other objects in view, the invention consists in the novel construction, combination and arrangement of parts to be hereinafter more fully described and claimed.

Referring to the drawing accompanying this application, like numerals of reference designate corresponding parts throughout the several views, in which:—

Figure 2:
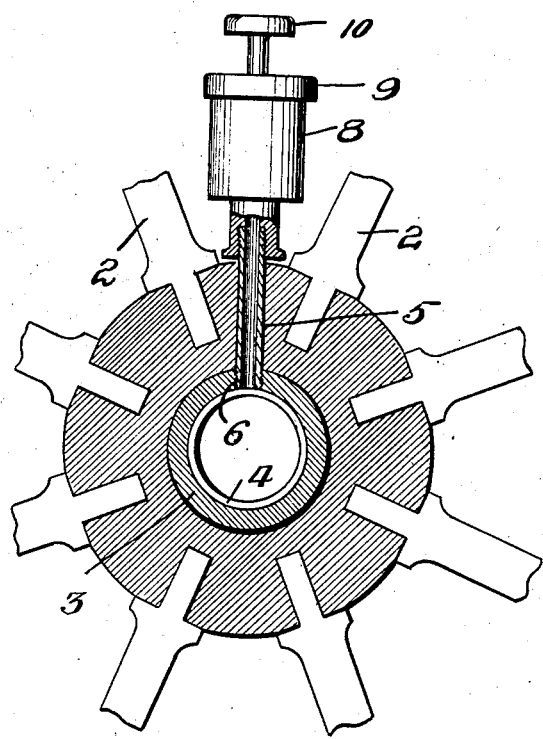

Figure 1 is a longitudinal sectional view of the hub of a vehicle wheel equipped with my improved lubricator, and Fig. 2 is a cross sectional view of the same.

In the accompanying drawing, I have illustrated a conventional form of vehicle wheel hub 1 having a plurality of spokes 2 arranged therein. My invention resides in providing the hub with a sleeve 3 having interiorly spirally arranged grooves 4 formed therein. The sleeve 3 serves functionally as a bearing sleeve for the spindle or stub of an axle (not shown), and is used in lieu of the ordinary bearing sleeve of a hub.

Mounted in the hub 1 between two of the spokes 2 thereof is a radially disposed tubing 5, the inner end of which is threaded into the sleeve 3, as at 6, and communicates with one of the grooves thereof. The outer end of the tubing 5 is threaded, as at 7 and is provided with a conventional form of lubricating receptacle 8 having a cap 9 and a plunger 10 arranged therein.

In the lubricant receptacle 8 is placed a suitable lubricating oil, which is fed to the groove 4 of the sleeve 3 through the tubing 5, and the arrangement of the grooves is adapted to convey the lubricant over the entire surface of the spindle or stub of an axle mounted therein, thus equally distributing the lubricating oil and providing a nonfrictional and easy-running engagement of the hub upon the spindle.

The sleeve 3 is preferably constructed of strong and durable metal having sufficient wearing qualities to withstand the rough usage to which it is subjected and I do not care to confine myself to the type of lubricant receptacle used in connection with said sleeve.

What I claim and desire to secure by Letters Patent, is:—

The combination with a wheel hub having an opening with the ends of said opening of greater diameter than the intermediate portion and said hub further provided centrally thereof with a radially extending aperture, that portion of the opening of smaller diameter being of a length greater than the portions of the opening of greater diameter of a sleeve mounted in said hub and of a length equal to the intermediate portion of said opening, said sleeve further provided with a continuous spiral groove extending from end to end of its inner face and said sleeve further having centrally thereof a recess, with the bottom of the recess at a point removed from the inner face of the sleeve, the bottom of said recess provided with an opening communicating with said groove and the side wall of said recess being screw threaded, said recess forming a continuation of and of the same diameter as the aperture in the hub, a tubular member extending through the aperture in the hub and abutting against the bottom of said recess, said member of a length to project from the outer face of the hub and provided on its inner end with peripheral threads engaging with the threads of said recess and said member further having that end which projects from the outer face of the hub screw threaded, and a lubricant reservoir mounted on the outer end of said member and engaging the screw threads upon said end.

In testimony whereof I affix my signature in the presence of two witnesses.

JOSEPH L. NEHRIG.

Witnesses:
   Max H. Srolovitz,
   E. E. Potter.